United States Patent [19]

Yu

[11] Patent Number: 5,561,456
[45] Date of Patent: Oct. 1, 1996

[54] RETURN BASED SCHEDULING TO SUPPORT VIDEO-ON-DEMAND APPLICATIONS

[75] Inventor: Philip S. O. Yu, Chappaqua, N.Y.

[73] Assignee: International Business Machines Corporation, Armonk, N.Y.

[21] Appl. No.: 287,434

[22] Filed: Aug. 8, 1994

[51] Int. Cl.⁶ .................................................. H04N 7/173
[52] U.S. Cl. ........................................ 348/7; 348/6
[58] Field of Search ................................. 348/7, 13, 10, 348/906, 6, 12; H04N 7/173

[56] References Cited

U.S. PATENT DOCUMENTS

| | | | |
|---|---|---|---|
| 5,410,343 | 4/1995 | Coddington et al. | 348/7 |
| 5,414,455 | 5/1995 | Hooper et al. | 348/7 |
| 5,421,031 | 5/1995 | De Bey | 348/7 |
| 5,453,779 | 9/1995 | Dan et al. | 348/13 |
| 5,461,415 | 10/1995 | Wolf et al. | 348/7 |
| 5,477,263 | 12/1995 | O'Callaghan et al. | 348/13 |
| 5,508,732 | 4/1996 | Bottomley et al. | 348/12 |

*Primary Examiner*—Victor R. Kostak
*Assistant Examiner*—Martha J. Hopkins
*Attorney, Agent, or Firm*—Richard M. Ludwin

[57] ABSTRACT

A Video-On-Demand (VOD) scheduler maintains a queue of pending performance for at least one movie and determines a maximum wait tolerance time for a longest waiting one of the pending performance requests. When stream capacities become available, rather than scheduling the movie immediately the scheduler delays performance of the video until just prior to expiration of the maximum wait tolerance time of the longest waiting one of the pending performance requests. In the interim, additional streams can join queue. When the performance occurs all performance requests on the queue are served from the a single stream provided from the assigned stream capacity.

9 Claims, 5 Drawing Sheets

RETURN BASED SCHEDULING TO SUPPORT VIDEO-ON-DEMAND APPLICATIONS

I. BACKGROUND OF THE INVENTION

1. Field of the Invention

The present invention relates the scheduling of performance requests in video-on-demand systems.

2. Related Art

In Video-On-Demand (VOD) systems, there are often hot videos (i.e. movies or other programs) which are requested by many viewers. Batching (letting viewers requesting the same video to share a single video stream) is often used to increase the system throughput.

Depending upon the system load, a video request may not get started immediately. While viewers can usually tolerate and accept a small delay (say 3–5 minutes), longer delays will typically cause some viewers to be turned away (i.e. leave the system after making or request or not even make the request at all). The likelihood that viewers will be turned away increases with the length of delay.

The conventional approach to video scheduling is the first-come-first-served (FCFS) policy. Under this policy, all video requests join a single request queue. Once a stream capacity becomes available, the request at the front of the queue is served. To support hatching, all subsequent requests on the same video are also served by this stream.

An alternative is to maintain a separate request queue for each video and select the video with the longest queue for the next showing. This is referred to as the longest queue length first (LQF) policy. Still another approach is to provide periodic showing (say every 5 minutes) for the hottest video. For other requests not covered by the periodic showing, another scheduling scheme such as FCFS can be used.

As mentioned before, waiting requests may depart from the queue if the waiting time exceeds the tolerance of the requesting viewers. This loss of viewers (sometimes referred to as reneging) is undesirable. The choice of video scheduling policy can have a significant effect on the amount of batching and viewer losses. The FCFS policy does not take into account the batching factor while the LQF policy ignores the wait time already incurred by the waiting requests. Periodic showing (when used alone) does not provide the flexibility needed to cope with dynamic load variations.

II. SUMMARY OF THE INVENTION

It is therefore an object of the invention to provide a solution to video request scheduler and admission control explicitly exploiting viewer delay tolerance to facilitate batching to maximize the return of the VOD system.

Assuming each viewer pays the same fee, the return increases with the viewers supportable. To exploit delay tolerance to facilitate batching, the completion schedule of the videos currently showing is taken into consideration in the scheduling decision.

In accordance with the above, a VOD scheduler maintains a queue of pending performance for at least one movie. When stream capacities become available, rather than scheduling the movie immediately, the scheduler delays performance of the video until just prior to expiration of the maximum wait tolerance time of the longest waiting one of the pending performance requests. In the interim, additional streams can join the queue. When the performance occurs all performance requests on the queue are served from a single stream.

III. BRIEF DESCRIPTION OF THE DRAWINGS

Like reference numerals appearing in more than one drawing depict like elements.

Figure 1:
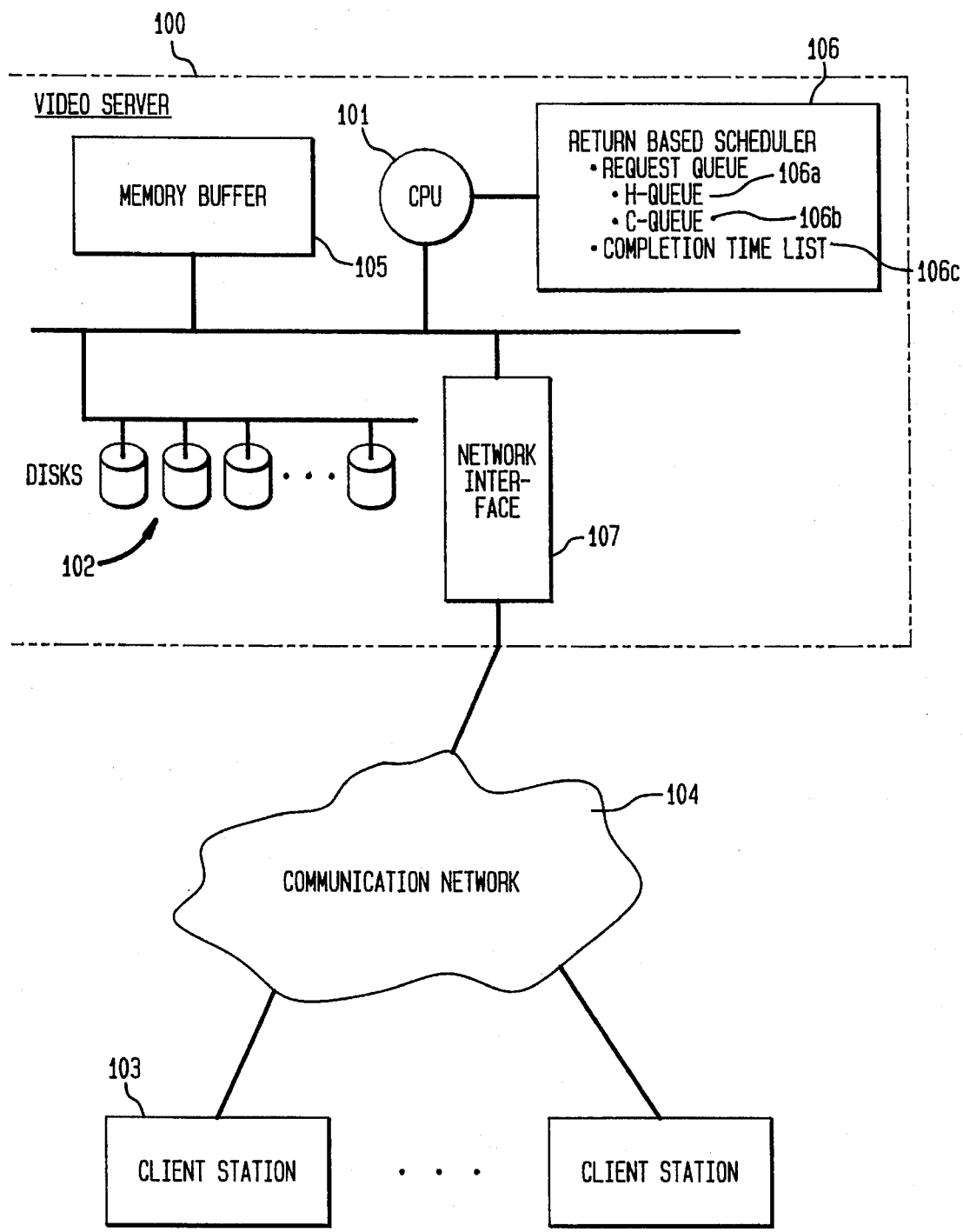
FIG. 1 is a block diagram of a multimedia server.

IV. DETAILED DESCRIPTION OF A PREFERRED EMBODIMENT a. Overview

There are two basic concepts in the present "return based" scheduler. The first concept is the policy of delaying the scheduling of a hot (frequently requested) video for as long as possible within the viewer's tolerance time. This is based on the probability that during the additional delay, some other requests for the same video will arrive. The other requests can then be batched to view a common video showing (performance) along with the original viewer's request. Certainly, delaying the original request too long can result in losing the original requesting viewer.

The other concept is that if a loss of viewers is inevitable due to the heavy load resulting from a long delay, it is better to lose the cold (less frequently requested) video viewers. This is due to the fact that the revenue from serving a batch of M viewers is M times that of showing a single viewer. In either case, one physical stream capacity is consumed. Hence, the return for a batch showing is much higher.

The return based scheduler maintains two separate wait queues. One is referred to as the H-queue which includes requests waiting for performances of the pre-designated hot videos and any other videos currently with multiple waiting requests. The H-queue can be implemented as multiple subqueues one for each hot video. The other is referred to as the C-queue which includes other waiting viewers for the cold videos. Whether a video is "hot" or "cold" is stored in a database and determined by the system or system operator based on requests received over a previous time period (e.g. the previous day). To maintain fairness, long waiting requests in the C-queue can be moved into the H-queue.) The scheduler also maintains a list of completion times for the videos currently being shown.

Assume that the viewers wait tolerance time is a small delay (say 3–5 minutes). It is assumed that within the wait tolerance time, the probability that a viewer will turn away within that amount of waiting time is negligible. For longer delays, some viewers will be turned away. For purposes of this discussion, the delay tolerance interval i accounts for both the users wait tolerance time and the time it takes to actually commence the requested video. Thus, the delay tolerance interval is actually somewhat shorter than the users delay tolerance time. In other words, when the delay tolerance interval expires, there is enough time remaining (e.g. 1 or 2 seconds) to commence the requested video before the users actual delay tolerance time expires.

The scheduler is invoked each time any one of the following events occurs: stream completion, the arrival of new requests or the earliest request in H-queue reaching its wait tolerance. Otherwise, the scheduler is in a wait (inactive) state. It works as follows:

Step 1:

When the scheduler is invoked, it first checks to see if each request on the H-queue can be scheduled within its delay tolerance interval i given the currently available streams and streams scheduled to complete in the future, excluding k of them, where k≥1 is a tuning parameter to be discussed later. If yes, the scheduler executes Step 2. Otherwise, the scheduler executes Step 4.

Step 2:

This represents the case with enough stream capacity available. If the C-queue is empty, go to step 6.

Step 3:

If the C-queue is not empty, the scheduler picks the earliest request from the C-queue and schedules it. The scheduler then exits and reenters the wait state.

Step 4:

This is the case with limited stream capacity. The scheduler determines the set, E, which is the set of videos with pending requests that have exceeded their delay tolerance interval or that will exceed their tolerance interval upon the next scheduling instance or stream completion time.

Step 5:

If some of the waiting viewers have exceeded their delay tolerance interval or will exceed the tolerance on wait times by the next scheduling instance, the scheduler picks the video with the earliest request in H-queue to schedule. If there is a tie, the scheduler picks the video with the longest queue to break the tie. Then, go to step 7.

Step 6:

If there is ample unutilized stream capacities, the scheduler picks the video with the earliest request in H-queue to schedule and then exit. In this context, the term "ample" means that there are enough unused stream capacities to schedule all pending C-Queue and H-Queue requests as well as all C-Queue and H-Queue Requests expected to be received within a threshold time period (e.g. by the next known scheduling instance). Otherwise, go to Step 7.

Step 7:

The scheduler exits and re-enters into the wait state.

Picking k>1 can reserve some additional capacity to accommodate hot videos which may not have any viewers at the current moment but may get a number of them subsequently. The k value should be a function of the hot videos which are not currently covered in H-queue.

In Step 5, an alternative is to select the video associated with the longest queue.

The intention of Step 7 is to delay the scheduling as long as possible within the viewers wait tolerance. For example, at time t, the scheduler finds that there are N requests for a particular video, $V_1$, on the H-Queue, where the earliest request arrived at t −30 seconds. The wait tolerance time for requests in this system is 2 minutes (which means that the delay tolerance interval i is perhaps 1 minute, 58 seconds). There is another request (for a different video, $V_2$) in the C-queue. The next available stream $S_2$ is scheduled to complete at t+3 minutes. The scheduler will not schedule the cold video $V_1$ (from the C-queue), because to do so would cause requests for the hot video $V_1$ to be lost. Thus, the scheduler enters into a wait state and is reinvoked at t+1 minute, 28 seconds. At that time, the scheduler commences the performance of video $V_1$ on stream $S_1$. Since i (1 minute, 58 seconds) has expired, the video will be shown at the last moment of the wait tolerance for the earliest requestor. This way, any additional requestors of video $V_1$ whose requests arrive in the 1 minute, 28 second interval while the scheduler is waiting can be scheduled to view the movie on stream $S_1$ before it commences.

In Step 7, where multiple requests exceed the delay tolerance interval, an alternative is to schedule the video associated with either the earliest request or the longest queue instead of deferring the scheduled playout.

b. Detailed Description

FIG. 1 is a block diagram of a video server 100, wherein video data (movies or other moving visual or audio visual performances) is stored in disks 102 and transmitted to the end client stations 103 over the network 104 upon request. The video server also includes other disks (not shown) which store working data and the program code for the video server 30 and can also include other storage devices such as video tape players and jukeboxes from which movies can be loaded on the disks 102.

The program code for the video server includes processes such as the servers main control program, a video scheduling program, a customer usage tracking program, and conventional communications, I/O and buffer management processes. The video server 100 includes a processor (cpu) 101 which executes a the processes under control of the main control program and a memory buffer 105 which is used for the temporary storage of portions of videos (thus enabling some users to be served from the memory buffer 105 rather than the disks 102). The memory buffer 105 can also be used to handle pause/resume requests by providing a temporary storage for portions of a video which stream from the disk while a viewer is paused. Other than the scheduler 106, the processes can be of a conventional type typically used in VOD systems.

The video server 100 can be embodied using any processor of sufficient performance for the number of video streams to be supported. For example, a small capacity video server could be embodied using a RISC System/6000 TM system while a larger capacity server could be embodied using an ES/9000 TM system (both available form International Business Machines Corporation of Armonk, N.Y.). This disk 102 can be of any conventional disk or of disk array. The communication network 103 can be, for example, a fiber optic network or a conventional bidirectional cable network. The client stations 103 can be embodied as a set-top box.

The scheduler 106 performs a number of tasks which result in the scheduling of performances for requested videos. In accordance with an embodiment of the present invention, upon receiving video requests from the client station 103, the scheduler (return based scheduler) 106 enters the requests into the appropriate request queue: H-queue 106a or C-queue 106b. Once a request is scheduled, the completion time is tracked in a completion time list 106c to assist future scheduling.

Figure 2:
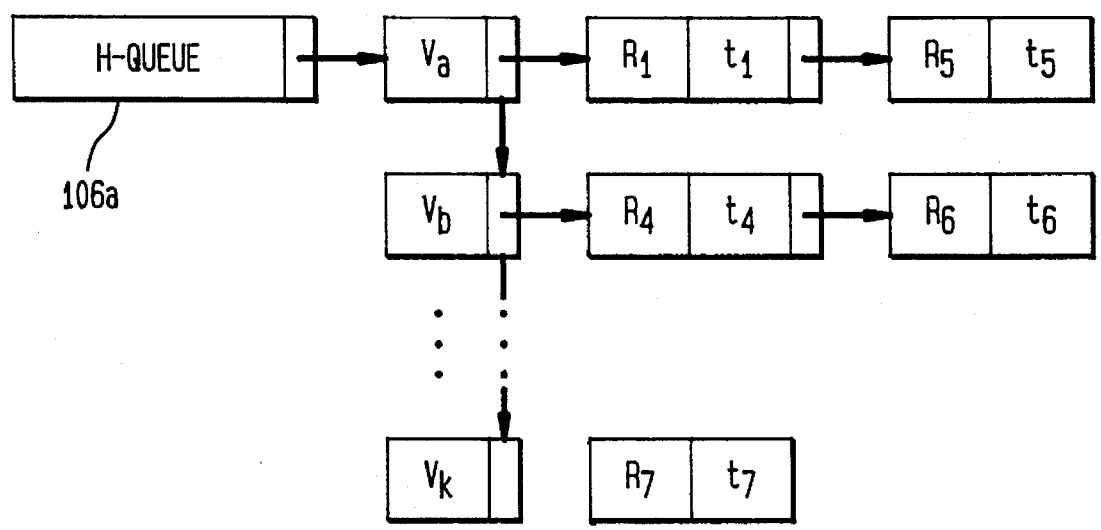
FIG. 2 is a data structure used by the return based scheduler to maintain of the request queue.
Figure 2:
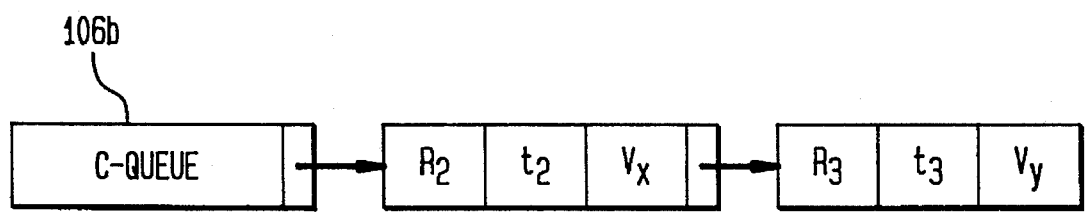

Referring now to FIG. 2 there is shown a data structure for the request queue according to an embodiment of the present invention. The request queue consists of H-queue 106a and C-queue 106b. The H-queue includes multiple subqueues, one for each video which is either a hot video, and other videos with a queue length longer than one, or with too long a waiting time. For each request, the requestor id ($R_i$) and the arrival time ($t_i$) are kept in the queue. In the C-queue which tracks the requests to the cold videos, a single queue is maintained according to the arrival order. For each request, the requestor id ($R_i$), the video requested ($V_i$) and the arrival time ($t_i$) are kept in the queue.

In FIG. 2, the H-queue has 3 hot videos $V_a$, $V_b$ and $V_k$ with requests queued. $V_a$ and $V_b$ each have two requests queued while $V_k$ only has one request queued. In the C-queue, there are 2 requests queued.

Figure 3:
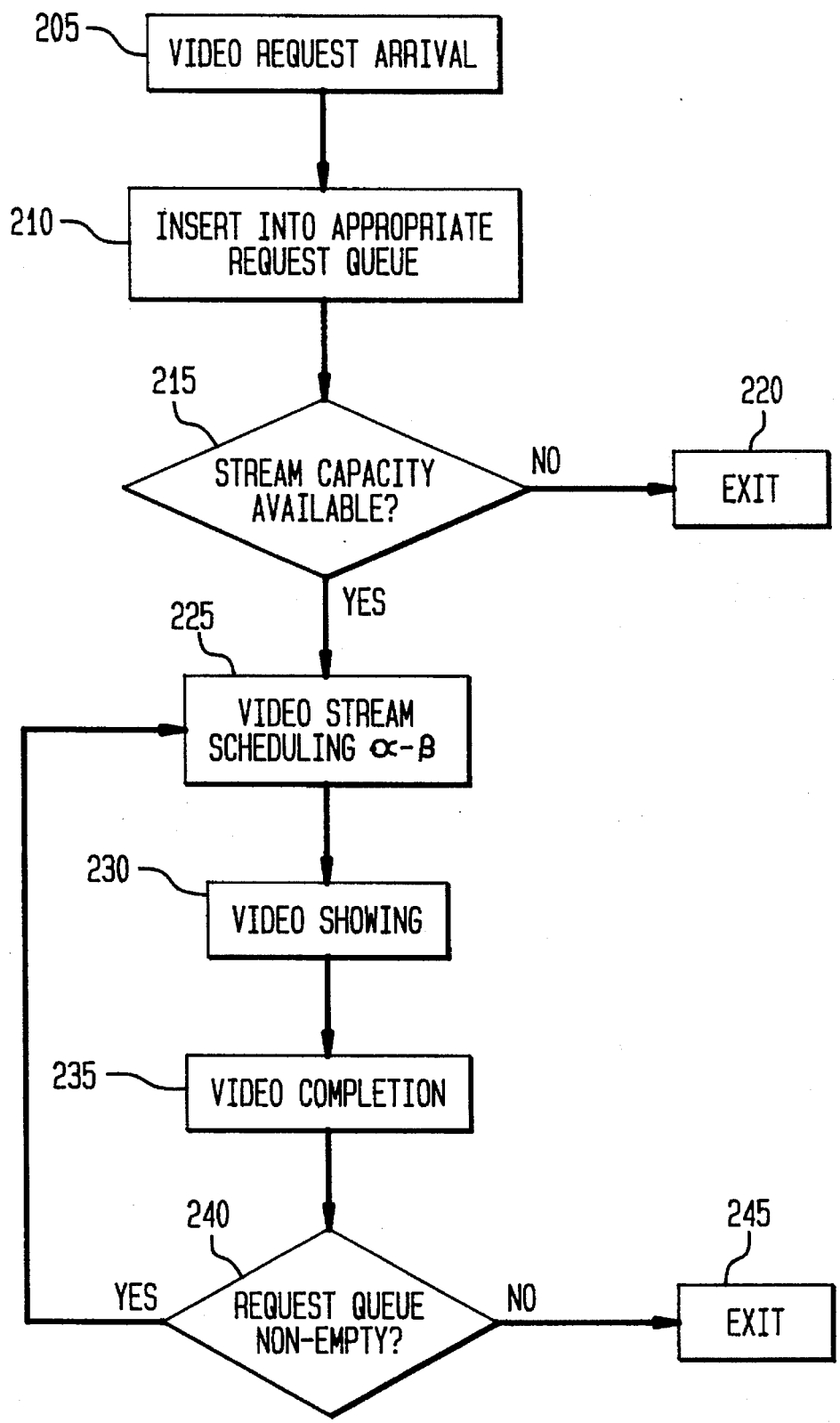
FIG. 3 is a flow chart showing an overview of request handling in the present system.

Referring now to FIG. 3 there is shows an overview of the handling of a given request return based scheduler 106 of FIG. 1.

In step 205, the scheduler 106 is invoked when it detects arrival of a video request.

Next, in step 210 the request is entered into the appropriate request queue (H-queue or C-queue).

In step 215, the available video stream capacity is checked. If there is no currently available stream capacity, in step 220 the scheduler enters exits. Otherwise, if there is available stream capacity, in step 225 the scheduler executes the video stream scheduling task of FIG. 4 to schedule a video for some waiting viewers.

Once the video has been scheduled, in step 230 the video is multicast to all the requesting viewers.

In step 235, the video completes and the corresponding video stream is released and is available for scheduling any waiting requests.

In step 240, the request queue is checked. If the request queue is empty, in step 245 the scheduler exits. Otherwise, if there are waiting requests, in step 225 the again executes the video stream scheduling task of FIG. 4 to schedule video requests.

It should be understood that while FIG. 3 tracks the handling cycle of an individual request, in fact, many of the steps of FIG. 3 can occur in parallel as the schedular handles different requests. This is best illustrated in FIG. 5A–5C.

Figure 5B:
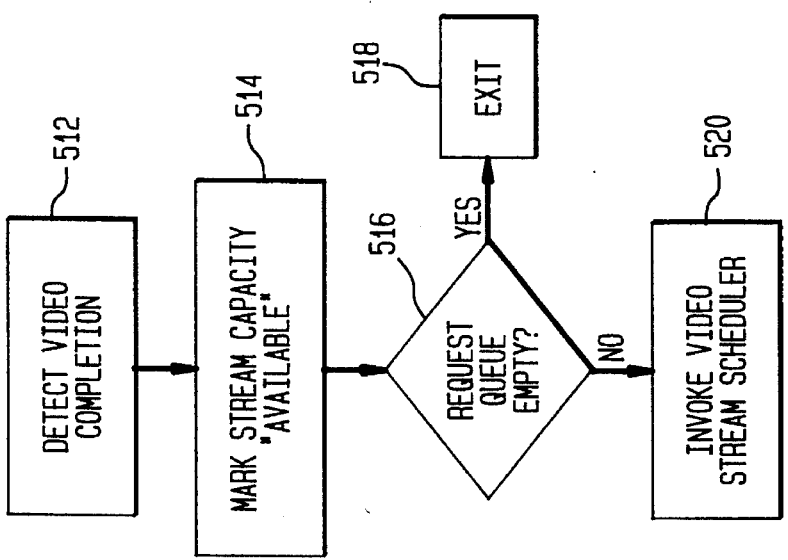
Figure 5C:
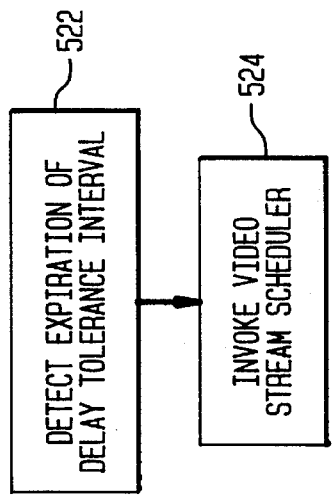
Figure 5A:
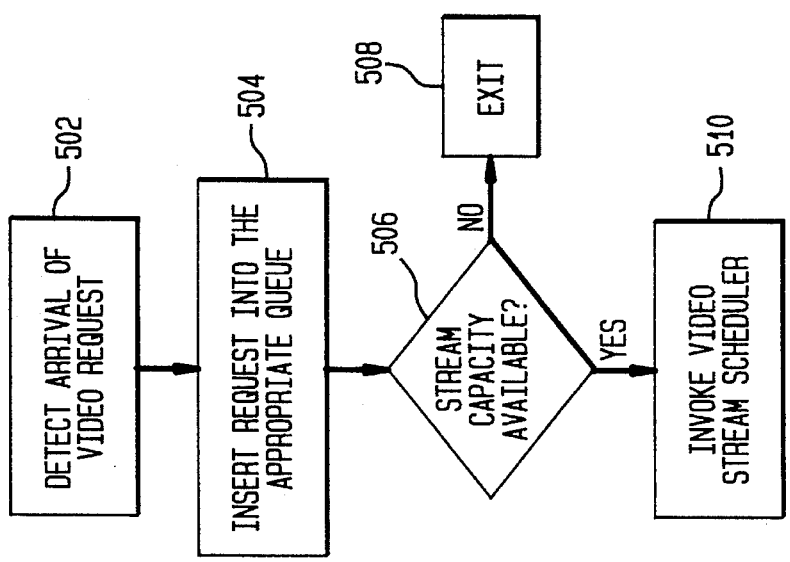

FIGS. 5A–5C are flow charts of event handling in the return based scheduler. Each of the tasks (5A, 5B and 5C) can execute in parallel for different requests, however, the video stream scheduler is a serialization point. That is to say that the video stream scheduler can be invoked by only one task or event at a time and executes to completion once invoked.

FIG. 5A is a flow chart of video request handling by the return based scheduler.

Each time a new performance request for a video is made by viewer, its arrival at the VOD system is detected by the scheduler in step 502.

Next, in step 504 the scheduler determines the appropriate queue for the request (H-queue or C-queue) and enters the request into the correct queue accordingly. If the request is to one of the hot videos or a video currently in the H-queue, it is inserted into the H-queue. Otherwise, the scheduler checks whether the requested video already appears in the C-queue, i.e. the requested video already has a queue on it. If so, the scheduler moves the new request and other waiting requests for that video into the H-queue. Otherwise, if the video has not appeared in the C-queue, the scheduler enters the new request into the C-queue.

Then, in step 506 the scheduler determines if there is any stream capacity available on the server. If there is no capacity available to service the request, the scheduler exits in step 508. At this point the request can not be scheduled until a currently running video completes and its associated stream capacity is freed. If the server has a stream capacity available, the schedular invokes the video stream scheduling task of FIG. 4.

FIG. 5B is a flow chart of video completion handling by the return based scheduler.

Completion of a video is detected by the schedular in step 512. A video can complete either by finishing the performance through to its scheduled end time or by all of the viewers of the video exiting the video (terminating the performance).

In step 514 the scheduler frees the stream capacity by marking it as being "available" (the use or availability status of each stream capacity is conventionally tracked by the video server by way of a status table).

In step 516 the scheduler checks the request queue to determine if it is empty (i.e. their are no pending requests on either the H-queue or the C-queue). If the request queue is empty, in step 518 the scheduler exits. Otherwise, if the request queue is not empty (there are waiting requests), in step 520 the schedular invokes the video stream scheduling task of FIG. 4.

FIG. 5C is a flow chart of delay tolerance interval expiration handling by the return based scheduler.

When the delay tolerance interval of a video has expired it is detected in step 522. This can be done, for example, by software which regularly checks the waiting time of the H-queue requests against the delay tolerance interval or in conjunction with a device such as an interval timer which is programmed to cause an interrupt when the delay tolerance interval of requests in the H-queue expire.

Figure 4:
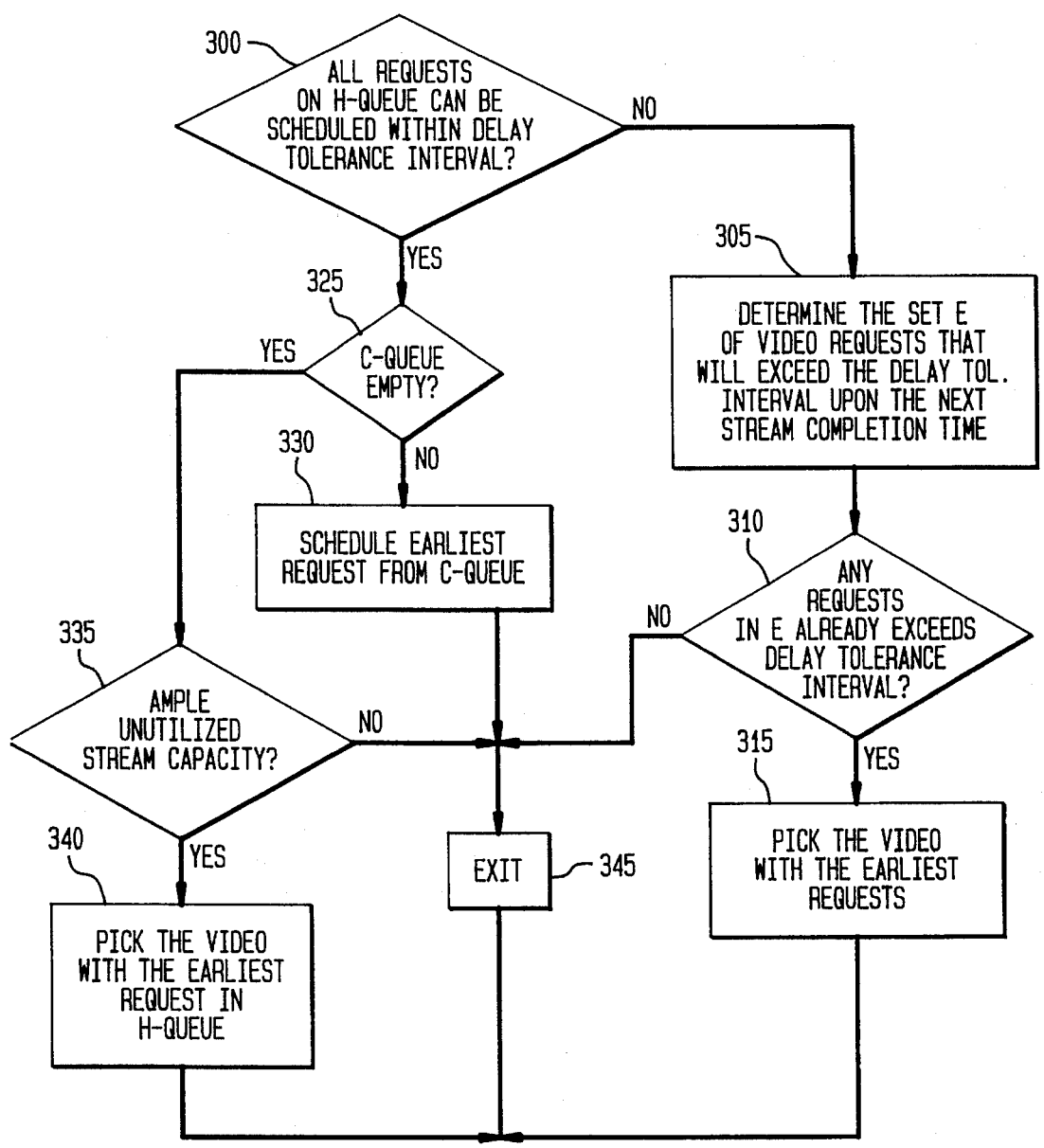
FIG. 4 is a flow chart of the video stream scheduling task of the return based scheduler; and, FIGS. 5A–5C are flow charts of event handling in the return based scheduler.

When the scheduler detects that an H-queue request's delay tolerance interval has expired, in step 524 it invokes the video stream scheduling task of FIG. 4.

Referring now to FIG. 4 the details of the video stream scheduling task are shown in more detail. The video stream scheduling task is invoked each time any one of the following events occurs: stream completion, the arrival of new requests or the earliest request in the H-queue reaching its wait tolerance. Otherwise, the task is in a wait (inactive) state.

In step 300, the scheduler first determines whether after excluding k streams, all requests on the H-queue can be scheduled within the delay tolerance interval using the currently available streams and streams scheduled to complete in the future. If all H-queue requests can not be scheduled within the delay tolerance interval, in step 305 the scheduler determines the set of video requests that will exceed the delay tolerance interval upon the next scheduled stream completion time. This set of video requests is referred to as set E.

In step 310, the scheduler determines whether any requests in set E have already exceeded the delay tolerance interval. If any requests in set E have already exceeded the wait tolerance interval, in step 315 the video with the earliest request arrival time is scheduled and all pending requests associated with that video are removed from the queue. Then, in step 345 the task exits until another event causes it to be invoked (i.e. the next earliest request in the H-queue reaches the delay tolerance interval, the arrival of a new request or the completion of a video).

If no requests in set E exceeds the wait tolerance interval, in step 345 the task exits until the earliest request in the H-queue reaches the delay tolerance interval or until another event causes it to be invoked (i.e. the arrival of a new request or the completion of a video).

If all H-queue requests can be scheduled within the wait tolerance, in step 325 the scheduler checks whether the C-queue is empty. If the C-queue is not empty, in step 330 the earliest request from the C-queue is scheduled. Then, in step 345 the task exits and until the earliest request in the H-queue reaches the delay tolerance interval or until another event causes it to be invoked (i.e. the arrival of a new request or the completion of a video).

If the C-queue is determined to be empty in step 325, in step 335 the scheduler checks whether there are ample number of video streams not utilized. If so, in step 340 the video associated with the earliest request in the H-queue is scheduled and in step 345 the task exits until the earliest request in the H-queue reaches the delay tolerance interval or until another event causes it to be invoked.

If a loss function on wait time is available, a mathematical optimization problem such as dynamic programming (as described for example by F. Hiller and G. Lieberman in *Operations Research*, Second Edition (1974), Holden-day, pages 248–275) can be formulated to select the next video so as to minimize the number of viewers lost or to maximize the return of the video server.

While in non-interactive VOD system, the stream completion is always known, even in an interactive VOD environment allowing pause-resume operations, the completion time can be made certain by using buffering to support the resuming of paused streams. In such systems, when a viewer pauses a video performance, the contents of the stream serving the viewer are placed into a buffer. Other viewers being served the video from the same stream continue to view the movie from the original unbuffered stream. When the paused viewer resumes, he is served from the buffer. Thus, the stream completion time of the original stream (originating from disk) remains constant.

Another issue related to the scheduler is the admission control. Given the scheduler policy, one can provide an admission control process to provide a rough estimate on the wait time to the requesters so each of them can make a decision on whether to wait for the videos at the very beginning. Still the viewers can change their mind and turn away before the showing, especially if it is a long wait and the estimate turns out to be an underestimate.

First consider the case where a hot video request arrives and there are other waiting requests for that video. The hot video request is hatched with the other requests on the same video, so its start time is the same as those requests. If there are no other viewers waiting for the requested video, the admission control process needs to determine if the request can be scheduled within the wait tolerance interval. If so, the request is scheduled no latter than the latest possible instance still satisfying the user wait time tolerance constraint. Otherwise, the request is scheduled at the next available stream completion time after all the current H-queue requests are satisfied.

For the case of a cold video request, the estimation can be a bit more difficult, since the scheduler is only using it as a filler to use up available stream capacities. The subsequent H-queue requests can cause further delay to the C-queue request than envisioned on arrival time.

The estimated wait time provided by the admission control can be multiplied by some expansion factor or presented in a less precise way in this case, e.g. say 5–10 minutes instead of 5 minutes. Alternatively, the admission control can continue to advise the waiting viewer on the new estimate of the wait time. To maintain some fairness to cold video viewers wanting to wait for the showing, we can move C-queue requests which have exceeded their upper limit on the estimated wait times to H-queue.

In the above-described embodiment, it is assumed that the requestors on a given system each have the same wait tolerance time and there is thus only one wait tolerance interval for the entire system. As an alternative, different requestors or requestors for different movies can be assigned different wait tolerance times (and thus different delay tolerance intervals).

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

I claim:

1. A method of scheduling viewer requests for a video-on-demand service provided by a video server, wherein the requests have a maximum wait tolerance time which can vary from one another, comprising the steps of:

maintaining, at the video server, queues of pending performance requests for each of a number of movies;

serving, as a batch, the pending performance requests on each queue from a common video stream, at a variable delay determined at least in part by the maximum wait tolerance time of at least one of the pending performance requests on the queue.

2. The method of claim 1 comprising the further steps of, during the delay, queuing additional requests for the movie and serving the additional requests from the common video stream.

3. The method of claim 1 comprising the further step of transmitting the common video stream from a video server to reception equipment at the viewer's locations, transmission of the common video stream causing the movie to be performed on the reception equipment.

4. The method of claim 1 wherein a first group of queues is maintained for frequently requested movies and a second group of queues is maintained for less frequently served movies and wherein the second group of queues is not served unless all pending performance requests in each queue in the first group of queues can be served before expiration of the maximum wait tolerance time for the longest waiting request in the queue.

5. A scheduler for use in a video-on-demand system of a type wherein pending movie requests have a maximum wait tolerance time after which requestors will renege the requests, comprising:

queue means for maintaining pending performance requests for a movie; and, means for determining a waiting time of a longest waiting one of the performance requests; and, means for serving all of the pending performance requests in the queue as a batch from one of the stream capacities, just prior to exceeding of the maximum wait tolerance time by the longest waiting one of the pending performance requests;

wherein the queue means includes means for maintaining a first group of queues for frequently requested movies and a second group of queues for less frequently served movies and wherein the server means does not serve the second group of queues unless all pending performance requests in each queue in the first group of queues can be served before expiration of the maximum wait tolerance time for the longest waiting request the queue.

6. A method of scheduling video viewer requests for a video-on-demand service provided by a video server, the requests have a maximum wait tolerance time, comprising the steps of:

maintaining, at the video server, a first group of queues for frequently requested movies and a second group of queues for less frequently requested movies;

determining when server stream capacities will become available;

based on when server stream capacities will become available, determining whether all pending performance requests in each queue in the first group of queues can be served before expiration of the maximum wait tolerance time for the longest waiting request the queue;

deferring scheduling of the performance requests in the second group of queues until it is determined that all pending performance requests in each queue in the first group of queues can be served before expiration of the maximum wait tolerance time for the longest waiting request the queue.

7. The method of claim 6 comprising the further step of moving a request from a queue in the second group to a queue in the first group after a period of time.

8. The method of claim 1 comprising the further step of assigning requestors for different movies different maximum wait tolerance times.

9. The system of claim 5 further comprising:

means for moving requests from the second group of queues to the first group of queues.

\* \* \* \* \*